US012598014B2

(12) United States Patent
Anstandig et al.

(10) Patent No.: US 12,598,014 B2
(45) Date of Patent: Apr. 7, 2026

(54) CONTENT DRIVEN INTEGRATED BROADCAST SYSTEM WITH ONE OR MORE SELECTABLE AUTOMATED BROADCAST PERSONALITY AND METHOD FOR ITS USE

(71) Applicant: FUTURI MEDIA, LLC, Seven Hills, OH (US)

(72) Inventors: Daniel Anstandig, Bay Village, OH (US); Craig Bowman, Durand, MI (US); Christopher Conlan, Fort Mill, SC (US)

(73) Assignee: FUTURI MEDIA, LLC, Seven Hills, OH (US)

( * ) Notice: Subject to any disclaimer, the term of this patent is extended or adjusted under 35 U.S.C. 154(b) by 224 days.

(21) Appl. No.: 18/618,484

(22) Filed: Mar. 27, 2024

(65) Prior Publication Data

US 2024/0333410 A1     Oct. 3, 2024

Related U.S. Application Data

(60) Provisional application No. 63/456,297, filed on Mar. 31, 2023.

(51) Int. Cl.
H04H 60/46         (2008.01)
G06F 3/0484        (2022.01)
(Continued)

(52) U.S. Cl.
CPC ........... H04H 60/46 (2013.01); G06F 3/0484 (2013.01); G10L 13/0335 (2013.01);
(Continued)

(58) Field of Classification Search
None
See application file for complete search history.

(56) References Cited

U.S. PATENT DOCUMENTS

2010/0241963 A1*   9/2010   Kulis .................... G06F 16/685
                                                               707/706
2015/0356126 A1*  12/2015   Kasravi ............... G06F 16/2228
                                                               707/769

(Continued)

OTHER PUBLICATIONS

Houser, Kristin. âAI is Now DJing Radio Stations. a Freethink, Freethink Media, Mar. 5, 2023, www.freethink.com/robots-ai/gpt-3-radiogpt. Accessed Dec. 8, 2025. (Year: 2023).*

(Continued)

*Primary Examiner* — Paras D Shah
*Assistant Examiner* — Ali M Hassan
(74) *Attorney, Agent, or Firm* — Hudak, Shunk & Farine Co. LPA

(57)     ABSTRACT

A web-based or downloadable software and hardware system and method for their use, that act together to generate creative content, such as for broadcast media distribution and wherein that system can incorporate one or more selectable machine generated broadcast personalities, including interactive personalities, and ones that can have a conversation with each other. More specifically, the present invention relates to a fully integrated cloud-based broadcast system which has the ability to address and interact with external sources, including for example, news, music, sports, social media, advertising, and live audience participation. This broadcast personality can be customized to include selected attributes and can include the ability to react iteratively to content, including on-air and in real-time. Moreover, the system is designed to provide safety protocols which include audio fingerprinting which the system uses for authentication and verification of the audio files in an aspect of the invention.

4 Claims, 2 Drawing Sheets

(51) Int. Cl.

| | |
|---|---|
| *G10L 13/033* | (2013.01) |
| *G10L 13/10* | (2013.01) |
| *H04H 20/95* | (2008.01) |
| *H04H 60/23* | (2008.01) |
| *H04H 60/66* | (2008.01) |

(52) U.S. Cl.
   CPC ............. *G10L 13/10* (2013.01); *H04H 20/95* (2013.01); *H04H 60/23* (2013.01); *H04H 60/66* (2013.01)

(56) References Cited

U.S. PATENT DOCUMENTS

| | | | | |
|---|---|---|---|---|
| 2019/0019497 | A1* | 1/2019 | Shin ........................ | G10L 25/24 |
| 2019/0082203 | A1* | 3/2019 | Bowman ............ | H04N 21/2187 |
| 2022/0172739 | A1* | 6/2022 | Shor ........................ | G10L 15/02 |
| 2025/0193619 | A1* | 6/2025 | Kim ........................ | G10L 25/30 |

OTHER PUBLICATIONS

Cridland, James. âFuturi Launches RadioGPTTM, the Worldas First AI-Driven Localized Radio Content.â Podnews, Feb. 24, 2023, podnews.net/press-release/radiogpt. (Year: 2023).*

Keys, Matthew. âFuturi Unveils Radio GPT, Automation Tech That Could Eventually Replace DJs and Producers.â TheDesk.net, Feb. 24, 2023, thedesk.net/2023/02/radiogpt-radio-gpt-futuri-new-product-djs/. Accessed Dec. 8, 2025. (Year: 2023).*

Wang, Yuxuan, et al. "Style tokens: Unsupervised style modeling, control and transfer in end-to-end speech synthesis." International conference on machine learning. PMLR, 2018. (Year: 2018).*

* cited by examiner

CONTENT DRIVEN INTEGRATED BROADCAST SYSTEM WITH ONE OR MORE SELECTABLE AUTOMATED BROADCAST PERSONALITY AND METHOD FOR ITS USE

FIELD OF THE INVENTION

The present invention relates to a web-based or down-loadable software and hardware system and method for their use, that act together to create live audio stream feed, to mix that with pre-recorded content for selective transmission and distribution of creative content, such as for broadcast media and for social media platform distribution and wherein that system can incorporate one or more selectable machine generated broadcast personalities. The invention includes the ability to have interactive machine generated broadcast personalities including multiple personalities that can have an apparent conversation with each other. More specifically, the present invention relates to a fully integrated cloud-based broadcast system which includes one or more auto-mated broadcast personality having the ability to address and interact with external sources, including for example, news, music, sports, social media, advertising, and live audience participation. This broadcast personality can be customized to include selected attributes and can include the ability to react iteratively to content, including on-air and in real-time. Moreover, the system is designed to provide safety protocols which include audio fingerprinting which the system uses for authentication and verification of the audio files.

BACKGROUND OF THE INVENTION

Broadcast media has historically been a highly regulated industry which delivers broadcast content at specified wave-lengths and specified time intervals so as to require receivers tuned to receive a specific signal for broadcast programming which had certain time driven mandates. Originally this included predominately live production of content including a live radio audience. Of course, with the developments of the internet and on-line broadcast possibilities, broadcast media, and particularly broadcast radio has evolved, although it retains structural elements from the early days.

For example, the industry has strived to retain the audi-ence excitement provided by real-time broadcast as it is evolved through the use of operational software and pro-gramming tools to replace spontaneous human driven play-lists and instead to incorporate pre-programmed playlists and pre-recorded or pre-programed content, including ele-ments such as music, sound effects, laugh tracks and applause to name a few.

Accordingly, traditional radio stations employ a combi-nation of automated content providers, such as music sources, combined with a Disc Jockeys or "DJs" to act as announcers to provide information, entertainment, and engage with listeners. These announcers typically introduce songs, provide news updates, weather forecasts, and partici-pate in various interactive segments to provide a spontane-ous feel, and to deliver excitement so that the automated portion of the content does not feel stale or "canned". However, there human announcers may not always be available to cover all time slots, and many small local stations, in particular, lack the budget to provide announcers for a full broadcast day, or in some cases, even for a portion of the day.

It is believed that the announcer system of the present invention can provide consistent and accurate audio content, can enable human operators involved in broadcast to be more efficient, can provide for a more diverse audio pres-ence, can introduce local color and marketing, can reduce operating costs, and can be available 24/7 to cater to the diverse needs of broadcast stations and their audiences.

SUMMARY OF THE INVENTION

The present invention relates generally to cloud based, content driven broadcasting systems and, more specifically, to a fully integrated cloud-based broadcast system which includes one or more automated broadcast personality, which has the ability to address and interact with external sources, including for example, news, music, sports, social media, advertising, and live audience participation. This broadcast personality can be customized to include selected attributes and can include the ability to react iteratively to content, including on-air and in real-time The present invention also provides an automated content driven broadcast station which integrates content playlists, such as music, sports, news and entertainment, with a customized personality based machine generated announcer, capable of providing filtered, accurate, up-to-date, and engaging spontaneous content for listeners. The system uses a content system to generate content and to integrate various sources of content from inside (internal) and outside (exter-nal) of the broadcast station, including for example, music, news, sports, entertainment, and social media.

The content system of the present invention monitors multiple digital social interactions around a topic or news story for the purpose of providing real-time insight on which topics are of greater importance to a particular audience. This system further provides the apparatus and structure to collect information deemed to be a topic, to take a set of references to the topic and integrate that into a thread and to place the thread into a pulse category, to calculate the amount of interest in the thread and the growth of interest in the thread as well as the rate of change of the growth of interest and to formulate a rank of the interest which is displayed visually to a consumer by pulse topic This content is monitored for increases and decreases in interest trends and ranked to provide "pulses" of curated content to be integrated in the form of audio files along with other programming and advertising. This content is ranked and parsed according to a defined syntax pre-selected by the broadcast station.

The content is passed to a broadcast programming system which uses a log through a link, for example through the use of breaknotes which may be parsed and subsequently used to create audio files in the form of machine generated voice tracks. The content system uses advanced artificial intelli-gence algorithms, natural language processing, and speech synthesis techniques such as text to talk synthesis ("TTS") to create high-quality, human-like voice for the voice track, and audio files incorporating the voice track then incorporate attributes selected by the broadcast station to imbue the voice track with apparent personality traits, including, for example, gender, age, speech characteristics, tonal modula-tion, pitch, timing, laughter, aspiration, prosody, and other audible indications of emotion or non-speech communica-tion.

The TTS technology can use known methods to imbue the resultant audio files with a sentient or human seeming sound. These would include the use of a trained neural network or Vocoder to create speech that is comprehensible, natural and appropriate conveys emotional content. Training can be accomplished using a human trainer or a trained AI, for example, using an expressivity score based on quantitative characteristics and may or may not be used to convey features, including accent, style, register, and emotion. This speech can be based on a fundamental frequency and be represented by or displayed as a wave-form (i.e., a pitch trace), but which is provided as an audio file or machine readable code capable of functioning with hardware of a given specification. Sampling techniques can be applied as a part of the synthesis. These files can also be provided in the form of intermediate speech data, such as by means of a spectrogram, including for example, a mel spectrogram which encodes a magnitude of a complex number as a function of frequency and time, and which uses short-term Fourier transform computed over a finite frame size, such as 50 ms and a suitable window function using a non-linear transform to convert the frequency axis. Alternatively, a deep learning based speech model which could use an algorithm based conversion module can be used to convert the intermediate speech to output speech audio files.

The resultant audio may include varying intonation or greater or lesser range, based on an aligned phoneme pitch and may also incorporate prominence pitch in the establishment of global values for a speaker, where a prominence peak is a value in a high frequency band for a given phoneme. This can be a single stage as described or two stage process, for example in the latter case, in which an intonation vector is generated using a pitch track received from a second speech synthesis model for received text and using that to generate a pitch vector based on the average pitch of each phenome, and in this case varying the intonation of one or more phenomes to produce an intonation vector. Similarly, timing and intensity can be manipulated to further modify the resultant speech and implied characteristics. Thus, the resultant prosody is based on one or more of pitch, intensity, timing, formants, and harmonicity.

In addition, the present invention uses audio fingerprinting of audio files that have been generated. Audio fingerprinting is a process that generates unique digital representations of audio signals, which can be used for various applications such as content identification and subsequent authentication and verification, copyright enforcement, and audio matching in music streaming services. Robust, efficient, and accurate audio fingerprinting algorithms are essential for enabling identification or authentication of audio signals even when subjected to distortion, compression, or transmission errors. The present invention provides a system and method for generating audio fingerprints for later verification and authentication. The system comprises modules for preprocessing, feature extraction, quantization, hashing, fingerprint generation, storage, and authentication and verification. Additionally, the fingerprint can be used as an ID for individual broadcasters and to ensure levels of security and exclusivity with respect to the generated audio files.

In one aspect, the method includes preprocessing a raw audio signal, extracting key features from the preprocessed signal, quantizing the extracted features, generating a series of hashes based on the quantized features, combining the hashes to form an audio fingerprint, and storing the fingerprint in a database or using it directly for comparison with other fingerprints.

Accordingly, one aspect of the invention is an automatic content generating AI voice driven announcer system, comprising:

1) a content generation module configured to:
    a. receive inputs from various data sources, including but not limited to, music playlists, news feeds, weather data, social media, and user-generated content;

b. process the inputs using natural language processing techniques to extract relevant information, analyze sentiment, and identify trending topics;
    c. generate contextually appropriate content for radio broadcasting, including but not limited to, song introductions, news updates, weather forecasts, and interactive segments;

2) a speech synthesis module configured to:
    a. convert the Machine generated content into human-like speech as an audio file using advanced text-to-speech algorithms, customizable to different voice types, gender, age, pitch, emotional content, speech patterns, accents, languages based on the generated content;
    b. apply audio processing techniques to optimize the generated speech for radio broadcasting, including but not limited to, volume normalization, equalization, and dynamic range compression;
    c. a fingerprint and authenticate and verify the audio file;

3) A control module configured to:
    a. integrate the audio file of the generated speech into the radio station's programming, including but not limited to, mixing with music tracks, advertisements, and other audio content;
    b. manage the timing and sequencing of the generated content based on predefined rules, real-time listener feedback, and other relevant factors;
    c. monitor the performance of the system and adapt the content generation and speech synthesis processes based on feedback, listener preferences, and ongoing learning; and 4) a user interface module configured to:
    a. allow radio station operators to customize the system's parameters including relating to the generated audio files, including but not limited to, voice settings, content preferences, and integration settings;
    b. provide real-time monitoring and control capabilities for the system, including but not limited to, content filtering, preview and optional iterative production content production capability, manual override, and performance metrics.

The foregoing and other aspects, features, and advantages of the invention will be apparent from the following detailed description of the invention.

DETAILED DESCRIPTION OF THE INVENTION

Figure 1:
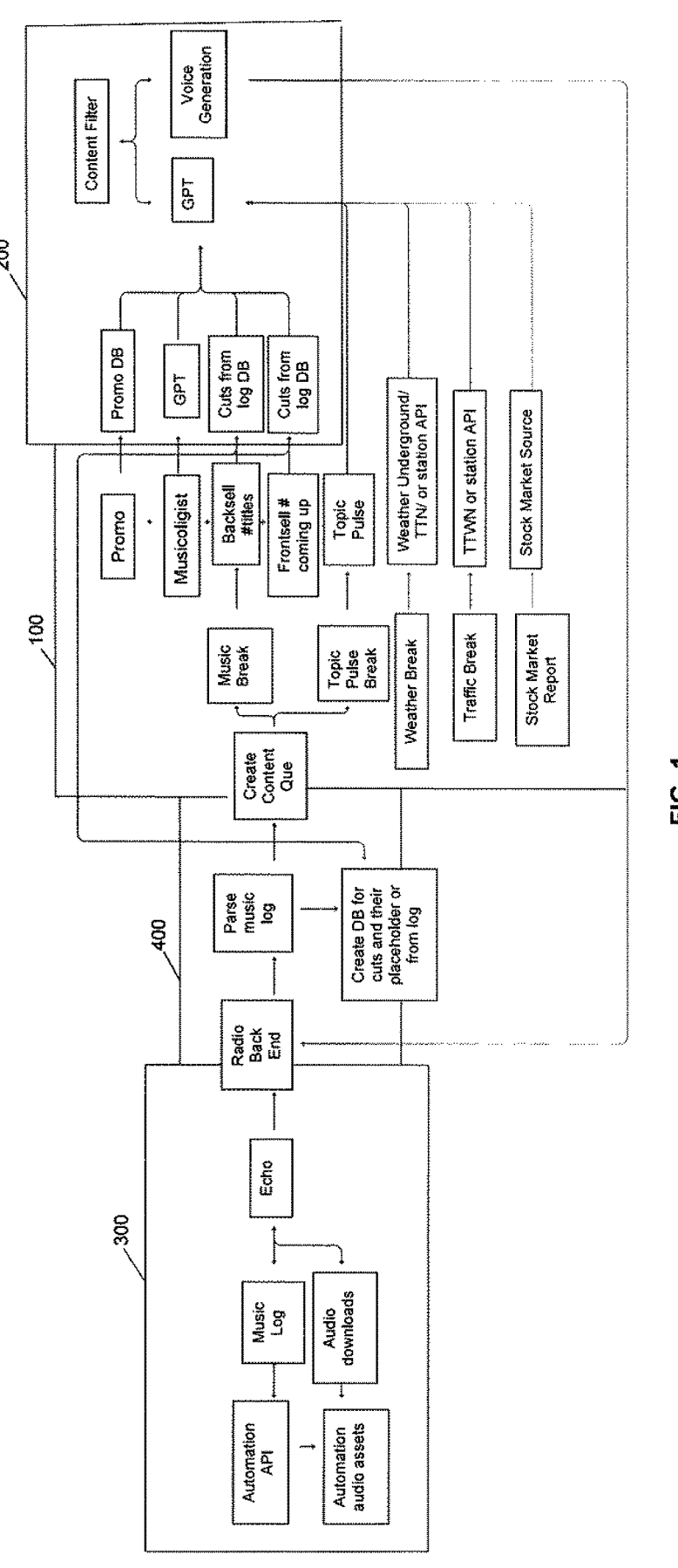
FIG. 1 is a block diagram of the invention.

FIG. 1 shows a block diagram of the present invention illustrating the various modules that provide for user directed automated generation of content. This generated content is subsequently subjected to manipulation by a voice synthesis module (which uses AI, or Artificial Intelligence, also referred to herein as "machine generated") which uses sophisticated analytics to determine an emotional content, and which subsequently creates an audio file based applying selected personality attributes to create one of more audio files. The audio files are then passed to a fingerprinting component and held until a control module directs the system to pass the audio file to an up-date feature or to play on-air. This is presented within the context of the interaction between the external stream source, i.e., the broadcast station or broadcast automation system and the content provider feed stream or broadcast automation system. While the invention can be implemented in a system which is implemented and managed apart from the broadcast station, it should be understood that the feed stream and production system source can be internal to the broadcast station and operate as part of the automation system and where a link of the present invention is used as a platform or mechanism to import either files external to the, file system, and/or automation system or to determine content to be placed into a file or location in existence in the automation system playlist or selection sequence. File storage and communication is secure and may take place behind with appropriate secure measures including, for example, fire-wall and/or encryption protocol, and the technology disclosed may also provide for library services with respect to the initial content and for the edited version as well. As mentioned-above, example mechanisms for accomplishing this include HTTP Live Streaming (HLS) style manipulation, but used for audio or audio and video, in which HTTP file transfer technology is used to transfer the feed segments to the cloud or other secure remote or in-house file locations. HLS is an HTTP-based media streaming communications protocol that works by breaking the overall stream into a sequence of small HTTP-based file downloads, each download loading one short chunk of an overall potentially unbounded transport stream.

In FIG. 1 we can see the various components of the invention including the following:

a content generation module 100 configured to receive inputs from various data sources, including but not limited to, music playlists, news feeds, weather data, social media, and user-generated content; process the inputs using natural language processing techniques to extract relevant information, analyze sentiment, and identify trending topics; generate contextually appropriate content for radio broadcasting, including but not limited to, song introductions, news updates, weather forecasts, and interactive segments; 2) a speech synthesis module 200 configured to: convert the Machine generated content into human-like speech as an audio file using advanced text-to-speech algorithms, customizable to different voice types, gender, age, pitch, emotional content, speech patterns, accents, languages based on the generated content; apply audio processing techniques to optimize the generated speech for radio broadcasting, including but not limited to, volume normalization, equalization, and dynamic range compression; and a fingerprint and authenticate and verify the audio file; 3) a control module 300 configured to integrate the audio file of the generated speech into the radio station's programming, including but not limited to, mixing with music tracks, advertisements, and other audio content; manage the timing and sequencing of the generated content based on predefined rules, real-time listener feedback, and other relevant factors; monitor the performance of the system and adapt the content generation and speech synthesis processes based on feedback, listener preferences, and ongoing learning; and 4) a user interface module 400 configured to allow radio station operators to customize the system's parameters including relating to the generated audio files, including but not limited to, voice settings, content preferences, and integration settings; and provide real-time monitoring and control capabilities for the system, including but not limited to, content filtering, preview and optional iterative production content production capability, manual override, and performance metrics.

By way of non-limiting example, various components are described and shown, which may perform various functions and interact with each other. These components may be segregated based on their function merely for the sake of description and may represent computer hardware and executable software code which may be stored on a computer-readable storage medium for execution on appropriate computing hardware or mobile devices. The various functions of the different components may be combined or segregated as hardware or software stored on a computer-readable medium in any manner, and may be used separately or in combination.

The present invention provides a system for creating and providing material in the form of audio based upon content captured or provided from externally based feed sources. The raw input is processed, such as by parsing, analyzing, indexing, comparing, filtering, curating, combining, storing, editing, accessing, and manipulating portions or all of the input. The processed data is subjected to a set of user determined rules along with selected voice attributes including for example, attributes that signal age, gender, register, emotion, pitch, phrasing, modulation, prosody, and other audio cues including laughter, breath, speech impediments, accents. This results in the production of the machine generated voice audio files for further incorporation as "hosts" or presenter AI voices into the broadcast feed resulting from the use of the present invention. Additional added broadcast material includes music, local and national news, sports, sound recordings, phone conversations, audience interaction, live conversation, virtual or internet presence. This can be supplied on one of more channels, where each channel includes metadata to mark the stream, which allows for indexing, identification, filtering and selective addition or elimination from newly created content. This feature allows an automated combination and transmission or distribution of content that ensures appropriate distribution, for example avoiding vulgarity or incendiary content.

The present invention uses AI-driven localized radio content solution, combining GPT-3 or 4 technology with AI-driven targeted story discovery and social content system to create an entire on-air presence which provides the similitude of a live DJ spontaneously presenting up to the moment entertainment, including localized news and information. The invention scans social media and over 250,000 other sources of news and information to identify which topics are trending locally, and then, using a content driven feed source, further uses machine driven technology to create a script and personality driven audio file for use on-air. The invention allows a user, including an audience end-user, to select from a variety of pre-selected machine generated voices, or to create their own unique hosting personality. One, two, three, or more selected personalities can interact by means of the admin selected controls to host, or to interact with existing human personalities for day-parts or to power an entire show. The ability to localize air-content in a turn-key fashion opens up resources for radio stations to deepen home-field advantages in new and unique ways, which eliminates the need or a liner card or sweeper-only air shift so that every station can be live and local.

Figure 2:
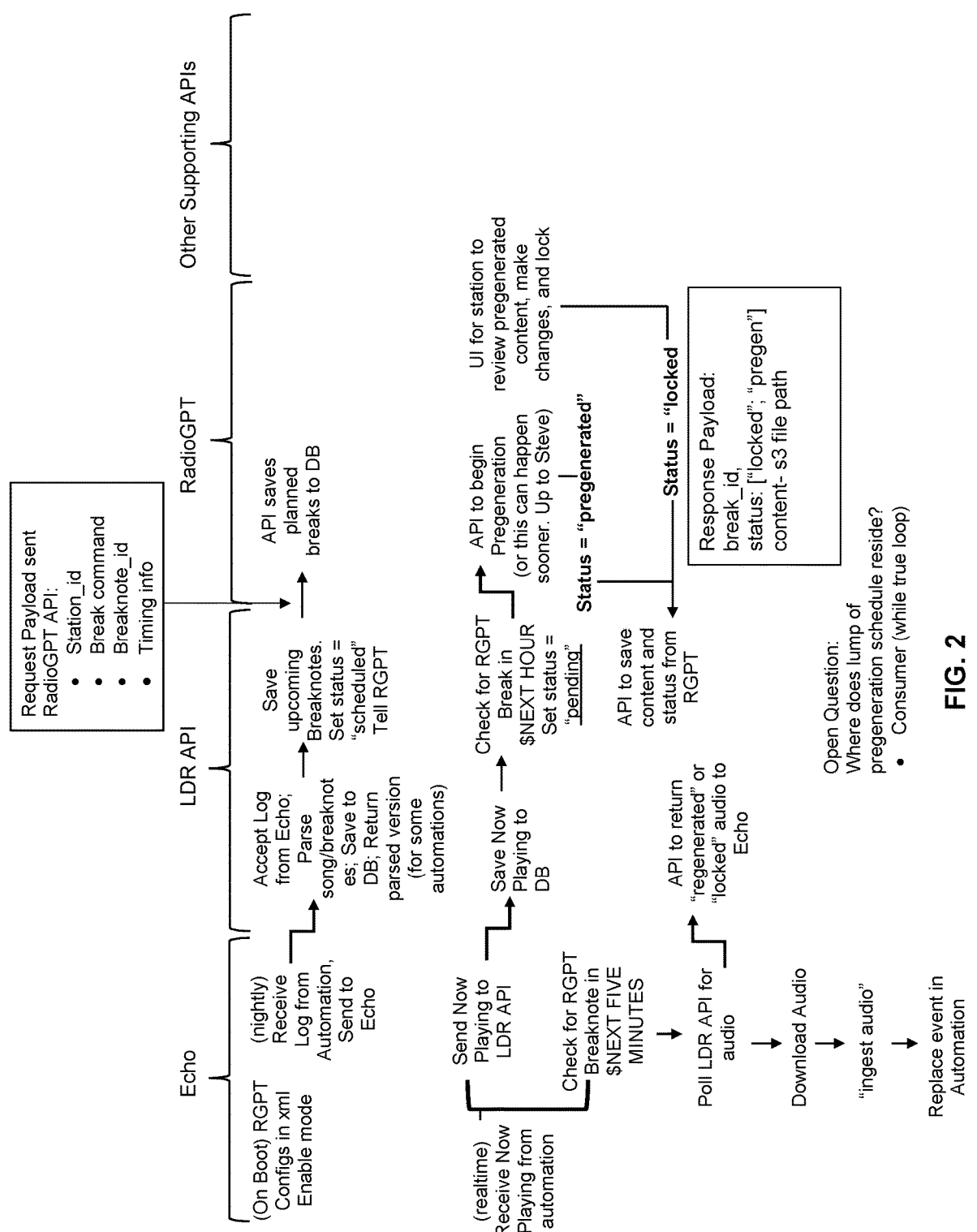
FIG. 2 is a schematic view of the system components.

FIG. 2 illustrates the components of an example implementation of the present system which can initially be accessed through a dashboard available to a front-end user or station administrator which or who enters criteria to control variables within the production process. In this implementation, a cloud-based production system is linked through the internet to a feed stream and receives an encoded feed stream which can be marked and thereby parsed for later use. The production system may be configured to act on the marked segmented feed stream by indexing, and transcribing the feed segments and by dividing the feed stream into channels as appropriate and which are linked back to the station administrator for example, for preview or approval of a generated audio file.

An analytic system may also be linked to the content production or distribution system. The analytic system may control or account for the content insertion. This can occur automatically, according to pre-arranged instructions, or immediately prior to broadcast with the help of human intervention. The analytic system may include a fingerprinting component for the identification of generated audio files. Subsequently, a filter may be applied according to user selection rules to determine if the dynamic content is cleared for use, and if so, where it may be distributed since it is possible to be cleared for some, but not all distribution channels. The clearance component may be similar to the copyright clearance inventions as known in the prior art.

The production component may be linked to a distribution system which is directed by the station administrator as to where to distribute the secondary production (i.e. the material represented by the selected marked segments and added additional material including the visual material, advertising material, and metadata). The distribution system directs the secondary production to locations which can be accessed by the ultimate audience member on a mobile, lap-top or desk-top or other dedicated device, i.e., through a broad-cast station web-site, pod-cast, or through social media services. In certain aspects of the technology disclosed, the front-end may cause content to be served from the cloud-based production system directly for consumption by listener via broadcast media, including specifically broadcast radio, social media or through the internet. The filter may happen at the back-end of the production system as well.

The invention may include a streaming transmitter system that interfaces with a broadcast automation system by a middleware system and for use with the systems described and comprises an input that receives analog audio and AOPIP through Livewire and NOW PLAYING information, which includes UDP, such as raw text and XML, and TCP, such as raw text and XML. This input may be segregated into component feed streams or channels for identification and use at a later point.

A dashboard can be used to allow an authorized administrator to make changes, including for example, host attributes or content source selection. The "administrator" is a set of instructions or person who is up-stream of the feed clip collection and production process and has the ability to take control of this process, whereas a "user", and in particular an "end-user" may also be an audience member, i.e., an entity or person downstream, who may participate in the social web-site or media based communications or to whom the results of the inventive process (i.e. the pod-cast or on-demand segment) is supplied on a device. The administrator has the ability to select a voice from a library of voices or to create a personality, including the use of an authorized human voice. The back-end further can direct the voice function to perform a script, include station settings and id, can track generated voice tracks, for example, in a voice track que, and acts to track breaknotes generated in a timed matrix. The voice library administrate determines the voice and enters a name for the voice to be used on air, which then becomes the label for the voice in the system of the present invention. For example, the control panel can be used to select host characteristics, voice attributes, emotional status, of one or more selected machine generated personalities based on age, gender, nationality, language, emotional tendencies, or other selected registerable attributes.

Once content has been curated to form a script, the user may select literal read or artful read which allows for the interpretation of the script, for example with additional selectable qualities, such as stability, clarity, speed and pitch. A breaknote is used to create talk breaks and a station adds breaknotes into a music log in locations where they want a talk break to occur. A single breaknote is generally used to denote a single talk break, although multiple breaknote commands may be indicated where commos are used to note multiple breaknote commands. These can be implemented using a breaknote wizard. Examples of instructions provided by the wizard include a literal tease of the next x number of artist, where x might be 1-5 artists, for example, and the script adds "coming up in the next few minutes {artist 1}, {artist 2}, {artist 3}, {artist 4}, and {artist 5}. Alternatively, the instruction might be for an artful tease, in which case the AI voice component is directed to add something like trivia about the selection or a delivery in rhyme, song, or with selected voice attributes, such as an accent. A similar method can be used to introduce selections or read weather. Likewise, local flavor can be introduced, such as by the interpretation of pulses from trending topics and promotions. In addition, multiple personalities may be used for these various talk breaks. This can even include the opportunity for live interaction between an audience member and the AI generated personalities.

The web-based admin control panel also includes options to override the automatic production where an administrative user may edit, combine or merge or un-merge certain items out of a template production including directions to a filter component or to the host audio file generation component. In the event that live human host or audience content is incorporated into the production system, an encoder can be used to mark a captured stream, including the ability to parse the stream automatically at given break point. For example, such an encoder can be a tone generator which may be configured to generate a tone on a microphone or capture system which is in-audible to the final audience. The tone generator may also be configured to add undetectable marked transmission of noise. The invention also includes a production system which is hardware having machine readable code and the code, or software system, which preferably resides in the cloud but which interfaces with the capture system by means of the internet.

Using a web-based admin control panel, the broadcast station administrator can also add new sources for the production system to collect additional information for the final production, for example, a report on the weather in a specific location, the top song of a particular genre, concert information, news regarding a title or artist or production label, or any of a number of selected content generating topics.

The content is received in the production system where it is reviewed, associated with the metadata or "fingerprint" or wave form identifier which can be used for evaluation as to whether the content meets selection criteria or whether it needs to be subject to be screened for elimination of de-selected material, such as might be problematic due to copyright or other concerns.

This system also performs selective review of content to eliminate material which is defined as sensitive material.

The nature of what sensitive material is can be automatically determined by the system through the application of the filtering system of the present invention and in accordance with a set of administrator instructions. These instructions may be used to filter material which is subject to copyright and not authorized for further use, to eliminate libelous, triggering or inflammatory subject matter or material or language which falls outside an age related set of ratings. Thus, the invention reduces the possibility of copyright infringement or other potential legal infractions, such as invasion of privacy or violation of libel or slander or requirements for truth in publication, or to produce material which meets certain parental criteria, or avoids sensitive issues.

Additionally, it will be understood that the various embodiments described herein may be implemented with data processing systems, which have more or fewer components than the illustrated system. For example, such data processing systems may include a cellular telephone or a personal digital assistant (PDA) or an entertainment system or a media player or a consumer electronic device, each of which can be used to implement one or more of the embodiments of the invention. The algorithms and displays presented herein are not inherently related to any particular computing system or other apparatus. Various general purpose systems may be used with programs in accordance with the teachings herein, or it may prove convenient to construct custom apparatuses to perform the method operations. In addition, a variety of programming languages, structure and techniques may be used to implement the teachings of the invention as described herein.

Some portions of the detailed description as set forth above are presented in terms of algorithms and symbolic representations of operations on data bits within a computer memory. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. Further, it is understood that components of the invention may be subject to AI or machine learning, which allows the system to self-educate and improve the efficiency of various components of the system, including the analytic and clearance component, as well as the integrated distribution component.

It should be understood that throughout the description, discussions utilizing terms such as "parsing", "encoding", "decoding", "filing", "transmitting" "distributing", "storing", "filing", "archiving", "scanning" or "filtering" or "calculating" or "collecting" or "tabulating" or "categorizing" or "displaying", refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices and which enables the further use, such as by visual display.

The invention may include various operations as set forth above or more or fewer operations in an order, which is different from the order described herein so long as the end purpose can be attained. The described operations may be provided in machine-executable instructions, which cause a general-purpose or special-purpose processor to perform certain tasks. Alternatively, these operations may be performed by hardware components that contain hardwired logic for performing the operations, or by any combination of programmed computer components and custom hardware components.

Thus, the software system of the present invention system includes software that permits a radio station' studio or other media or digital publication platform automation system to interact via an external communication means such as the web, with a separate server which hosts the process of reception of the transmission of the marked feed stream including the feed clips, filing and storage of the feed stream. Specifically, the software monitors a definable location for production information, such as new log exports, which are generated by the radio station automation system or a music scheduling program. In aspects of the technology disclosed, a distribution system linked via an IP network to the production system may be used. In certain aspects, the distribution system may be configured to distribute a created secondary production in accordance with a set of user enabled instructions, "user enabled distribution instructions", whereby the secondary production is available for download or streamed to a user device.

The software system of the present invention uses a surrogate or placeholder based on admin directed breaknotes for an audio file generated in accordance with the present invention. The file is a text-based file which uses row and comma format for data that represents the on-air schedule for a broadcast station for a given period, such as a broadcast day. The invention subsequently copies the audio file contents into this placeholder file to cause that selection to be incorporated into the template for the creation of the secondary production file.

The software production system of the present invention includes components, each responsible for a separate process, that can be combined together in the system of the present invention. A component of the system may include a web-based API that can use the following parameters:

stationId—A string of characters that identifies the station to the audience participation system auth_username—A string of characters representing the username used for authentication auth_password—A string of characters representing the password user for authentication selectionID—A string of characters that contains the category and cart number of the selection from the broadcast station automation system. These two pieces of data combined identify the selection in the automation system. These two pieces of information are combined into one string and separated by a forward-slash ("/"). The category comes first, followed by the cart number.

Example: S01/0865 stationcallsign—Radio Station personnel create the template including a secondary production schedule for a given time period. Production system template commands are contained within this schedule.

The template instructions are exported to a text file on the file system. The software link system, while monitoring for new log export files, discovers the new export file and reads it from the file system and sends a log export file to a broadcast station automation system API via the HTTP interface. The connection is left open so that the broadcast automation system server can send information back, read the template commands from the export file, and replaces the necessary commands with placeholder files, which the software link will later change with the feed clips. The updated export file (with new placeholders) is sent back to the software link system 10 application through the still-open HTTP connection, which then closes the connection.

The system of the present invention includes analytics meaning the ability to tailor the criteria for the production process as to the audience make-up or complexion, demographic, geolocation and participation value, as well as content based considerations, such as flow and provider identity. It also provides security measures to maximize both the data security of the internal automation system of the provider and the flow of information via the social media to the audience members.

The analytics referred to above are part of a fingerprinting and authentication/verification component of the system. The analytics can act to filter the dynamic content through an analysis of the meta-data, the transcription, and the fingerprint of the audio. Digital fingerprints are compact digital representations of a media content item (or a segment of a media content item) extracted from a media content item (audio or video) which represent characteristics or features of the media content item with enough specificity to uniquely identify the media content item. Original media content items (e.g., known works) may be registered to the identification service, which may include generating a plurality of segments of the original media content item. Digital fingerprints may then be generated for each of the plurality of segments. Fingerprinting algorithms encapsulate features such as frame snippets, motion and music changes, camera cuts, brightness level, object movements, loudness, pitch, brightness, spectral bandwidth, energy in one or more spectral bands, spectral steadiness, Mel-frequency cepstral coefficients (MFCCs), and so on. The fingerprinting algorithm that is used may be different for audio media content items and video media content items. Additionally, different fingerprinting algorithms may be used to generate digital fingerprints usable to identify a copy of a known work and to generate digital fingerprints usable to identify a cover of a known work. Digital fingerprints generated for a registered work are stored along with content metadata in a repository such as a database. Digital fingerprints can be compared and used to identify media content items even in cases of content modification, alteration, or obfuscation (e.g., compression, aspect ratio changes, resampling, change in color, dimensions, format, bitrates, equalization) or content degradation (e.g., distortion due to conversion, loss in quality, blurring, cropping, addition of background noise, etc.) in embodiments. Additionally, or alternatively, digital fingerprints may be usable to identify covers of known media content items.

The digital fingerprint (or multiple digital fingerprints) of the unknown media content item may be compared against the digital fingerprints of all known works registered with a licensing service. In some embodiments, media identifier applies an unknown media content item, one or more segments of the unknown media content item, set of features of the unknown media content item, or digital fingerprint(s) of the unknown media content item to a trained machine learning profile. The trained machine learning profile may then classify the unknown media content item as music or as not music. If the unknown media content item is classified as containing music, the media identifier may compare digital fingerprints of the unknown media content item to digital fingerprints of known works that also contain music. This may reduce the processing resources utilized to match the digital fingerprint. Once the digital fingerprint of the received media content item has matched an instance of a known work, the media content item is identified as being a copy of the known work.

In the event that an external identification service is used, it may determine one or more actions to take with regards to the media content item that has been identified. For example, the media content item may be tagged as being the known work, advertising may be applied to the media content item and licensing revenues may be attributed to the owner of the rights to the known work (e.g., by licensing logic), the media content item may be removed from the media content sharing platform, and so on. In some instances, the media identifier may be hosted by a different server computing device than the server computing device. The representations and identification may be based upon feature vectors, a spectral representation of the unknown work, the text output of a speech recognition system, musical score produced by a music transcription system, or a bit calculated key method, such as MDS hash, as are known in the art.

An unidentified media content item may be received by a processing device. A set of features of the unidentified media content item may be determined. Metadata associated with the unidentified media content item may be determined. A first similarity between the metadata associated with the unidentified media content item and additional metadata associated with a known media content item from a media content repository may be determined. A second similarity between the set of features of the unidentified media content item and an additional set of features associated with the known media content item may be determined. The unidentified media content item may be identified as a cover of the known media content item based on the first similarity and the second similarity by the processing device.

The media content identification service may determine features for the unidentified media content item. The media content identification service may determine metadata associated with the unidentified media content item. The media content identification service may determine a first similarity between the metadata of the unidentified media content item and additional metadata associated with a known media content item of a plurality of media content items from a media content repository. The media content identification service may determine a second similarity between the determined set of features of the unidentified media content item and an additional set of features association with the known media content item. The media content identification service may identify the unidentified media content item as a cover of the known media content item based upon the first similarity of the metadata and the second similarity of the set of features.

The media content identification service may further update the metadata of the unidentified media content item to include cover information that identifies the unidentified media content item as a cover of the known media content item. A cover version or cover is a new performance or recording of a previously performed or recorded musical composition. The metadata within the unidentified media content item may include a metadata description attribute that describes the unidentified media content item.

The media content identification service may further compare the metadata associated with the unidentified media content item with additional metadata associated with two or more of the plurality of known media content items. The media content identification service may determine similarity values for each of the two or more of the plurality of known media content items based on the comparison. The similarity values may represent a similarity between metadata associated with a known media content item and the metadata associated with the unidentified media content item. The media content identification service may determine a set of known media content items that have similarity values that meet or exceed a similarity threshold. The media content identification service may compare the set of features of the unidentified media content item to sets of features of each of the known media content items in the set of known media content items.

The media content identification service may, when determining the first similarity between the metadata associated with the unidentified media content item and the additional metadata associated with the known media content item, normalize the metadata of the unidentified media content item to generate a normalized descriptive text for the unidentified media content item. The media content identification service may compare the normalized descriptive text of the unidentified media content item with normalized descriptive text of the known media content item. The normalized descriptive text of the known media content item may be based on the additional metadata associated with the known media content item. The media content identification service may generate a similarity score between the normalized descriptive text of the unidentified media content item and the normalized descriptive text of the known media content item. The media content identification service may determine that the similarity score is above a similarity threshold.

Audio fingerprinting is a process used to create a unique digital representation, or fingerprint, of an audio signal that can be later used for authentication, verification, or identification purposes. An overview of the audio fingerprinting process is as follows:

1. Preprocessing: The raw audio signal is converted into a more manageable format for analysis. This typically involves converting the audio to a mono signal, normalizing volume levels, and resampling the audio to a standard rate.

2. Feature extraction: The preprocessed audio signal is then analyzed to extract key features that can be used to create a unique fingerprint. One common method is to extract spectral features, such as the distribution of frequencies and their intensities, which can be represented as a spectrogram. Other features could include temporal characteristics or psychoacoustic properties, which take into account how the human ear perceives sound.

3. Quantization: The extracted features are then quantized to create a simplified representation of the audio signal. This may involve thresholding, rounding, or other techniques to reduce the amount of data while still retaining the essential information needed for accurate fingerprinting.

4. Hashing: The quantized features are used to generate a series of hashes, which are unique codes that can be efficiently compared to hashes from other audio signals. This is typically done using algorithms that ensure small variations in the audio signal, such as background noise or minor distortions, do not significantly alter the resulting hash values.

5. Fingerprint generation: The series of hashes are combined to form the final audio fingerprint, which is a compact representation of the audio signal. This fingerprint can be stored in a database or used directly for comparison with other fingerprints.

6. Authentication and verification: For later authentication or verification, the same fingerprinting process is applied to a new audio signal. The resulting fingerprint is then compared to the stored fingerprints to identify a match or to verify that the audio is genuine. This can be done using various distance or similarity metrics, such as the Hamming distance or the Jaccard similarity coefficient. Audio fingerprinting algorithms are designed to be robust, efficient, and accurate, enabling them to identify or authenticate audio signals even when subjected to various forms of distortion, compression, or transmission errors.

In certain aspects, the technology disclosed describes a production and/or creation system for creating and providing broadcast content which incorporates an audio file created using an AI speech generated component. The production creation system includes a content generation component that can be based on user indicated timing to read a literal script or to interpret and incorporate external content. The production creation system is linked through the internet to receive a log and log instructions and to find and incorporate additional material as directed so as to create generated content, which is used to create an audio file using a customized machine generated personality where the audio file is provided to a presentation device (e.g., a station automation system) of a broadcast station. In addition, the audio file is further subjected to fingerprinting by the production system which is used for verification and authentication of that feed clip for security and to provide proprietary rights to individual users (such as to ensure that individual audio files are not identical in content and personality profile in contradiction to user contractual rights and transmitting the fingerprinted audio file to a distribution system; and a distribution system comprising a machine with machine readable code which is linked, e.g. via an IP network such as the internet, to the production system and which is configured to distribute the audio files as indicated.

While in accordance with the patent statutes the best mode and preferred embodiment have been set forth, the scope of the invention is not limited thereto, but rather by the scope of the attached claims.

What is claimed is:

1. An automatic content driven machine generated personality announcer system for use in broadcast media, comprising:

a content generation module configured to generate machine generated content by:

receiving inputs from various data sources, including one or more of music playlists, news feeds, weather data, social media, and user-generated content;

processing the inputs using natural language processing techniques to extract relevant information, analyze sentiment, and identify trending topics;

generating contextually appropriate content for broadcast media, including one or more of song introductions, news updates, weather forecasts, and interactive segments;

a speech synthesis module configured to create a speech synthesis file by:

converting the machine generated content into human-like generated speech as an audio file using at least one text-to-speech algorithm, customizable to one or more of different voice types, gender, age, pitch, emotional content, speech patterns, accents, languages based on the generated machine content;

applying audio processing techniques to optimize the human-like generated speech for radio broadcasting, including one or more of volume normalization, equalization, and dynamic range compression;

fingerprinting, authenticating and verifying the audio file;

a control module configured to control a performance of the machine generated personality announcer system by:

integrating the verified audio file of the human-like generated speech into a broadcast program, including one or more of mixing with music tracks, advertisements, and other audio content;

managing the timing and sequencing of the machine generated content based on at least one of predefined rules, and real-time listener feedback;

monitoring the performance of the machine generated personality announcer system and adapting the content generation module and speech synthesis module based on feedback, listener preferences, and ongoing learning; and a user interface module configured to administer the machine generated personality announcer system by:

allowing an administrator to customize parameters of the system's parameters relating to the human-like generated audio file, providing real-time monitoring and control capabilities for the system using one or more of content filtering, preview and optional iterative production content production capability, manual override, and performance metrics.

2. An automatic content driven machine generated personality announcer system as set forth in claim 1, wherein the customizable parameters include one or more of voice settings, content preferences, and integration settings.

3. An automatic content driven machine generated personality announcer system as set forth in claim 1, wherein the predefined rules includes a defined matrix of characteristics defined as pulses and a level of listener interest is categorized into a plurality of categories.

4. An automatic content driven machine generated personality announcer system as set forth in claim 3, wherein the wherein the level of listener interest ranks one or more of a cumulative interest in a topic, a growth of interest in a topic, a decline of interest in a topic, and a rate of growth of interest in a topic.

* * * * *